United States Patent [19]
Birman et al.

[11] 3,921,059
[45] Nov. 18, 1975

[54] POWER SUPPLY INCORPORATING, IN SERIES, A STEPPED SOURCE AND A FINELY REGULATED SOURCE OF DIRECT CURRENT

[75] Inventors: Paul Birman, Flushing; Sarkis Nercessian, Long Island City, both of N.Y.

[73] Assignee: Forbro Design Corporation, New York, N.Y.

[22] Filed: Mar. 22, 1974

[21] Appl. No.: 454,012

[52] U.S. Cl. .................. 323/21; 321/18; 323/24; 323/25; 323/43.5 S
[51] Int. Cl.² ..... G05F 1/58; G05F 1/62; G05F 1/64
[58] Field of Search ............ 307/61, 63, 75, 77, 82; 321/18, 20; 323/21, 23, 24, 25, 40, 43.5 S, 45

[56] References Cited
UNITED STATES PATENTS 3,161,778  12/1964  Harrison et al. ................ 307/77 X
3,379,960  4/1968   May ................................ 323/45
3,611,117  10/1971  Schneider ....................... 323/45
3,684,949  8/1972   Yamachi et al. ............. 323/45 X
3,777,188  12/1973  Mazur ........................... 323/21 X

OTHER PUBLICATIONS

Application Note 90 Circuit Principles, Hewlett—Packard DC Power Supplies Catalog & Handbook, 1968, pp. 52–54.

Primary Examiner—A. D. Pellinen
Attorney, Agent, or Firm—Alfred W. Barber

[57] ABSTRACT

A regulated power supply is operated with a precision series regulator over a predetermined range of output voltage or current. This range is added to relatively large steps of unregulated voltage to provide an overall range several times the predetermined range. Suitable overlap and time delay result in stable operation of the system. All operations are automatic and electronically controlled.

10 Claims, 3 Drawing Figures

POWER SUPPLY INCORPORATING, IN SERIES, A STEPPED SOURCE AND A FINELY REGULATED SOURCE OF DIRECT CURRENT

Electronically regulated power supplies regulated with series control elements and fully dissipative, i.e. providing the full range from maximum output to zero by the sole means of the series regulator are expensive and relatively inefficient particularly at low-voltage and high current output. Several methods have been employed in the past to improve the situation. Preregulators and ganged control of input voltage are two of the more common methods. The preregulators generally employ phase controlled silicon controlled rectifiers resulting in undesirable line voltage noise generation (RFI). The ganged controls using switched transformer secondaries or variacs are mechanical systems often heavy and cumbersome.

SUMMARY

A fully dissipative precision series regulator is controlled to regulate the output voltage or current of the power supply over a predetermined range of, say, 100 volts. This regulator supplied with a suitable unregulated input voltage provides any required output voltage from 0 to 110 volts (100v nominal) and highly regulated. If an output voltage of over 100 volts but less than 200 volts is called for, the power transformer secondary voltage is changed by means of an electronically controlled tap changer. To extend the range another 100 volts, e.g. from 200 to 300 volts, a third secondary tap is selected and so on to whatever final maximum output voltage is to be provided.

The output voltage and current are sensed and compared with appropriate control voltages with the resultant controlling the series regulator of the 100 volt regulated supply. The voltage of the 100 volt supply is monitored. If it rises above 110 volts the next higher tap of the unregulated supply is selected adding 100 input volts. If it falls below 5 volts, the next lower tap of the unregulated supply is selected subtracting 100 input volts.

The power transformer secondary taps are selected by means of a shift register which operates through an optocoupling isolator to activate a selected tap connected triac. When the system is first turned on, the shift register is cleared. After a suitable delay if the system calls for more voltage than the initial 100 volts supplied by the regualtor section, a clock pulse is enabled and a one count is entered in the shift register which in turn activates the lowest tap triac. If still more output voltage is called for, a second count is entered activating the second tap triac and so on until the output voltage calls for more than five volts and less that 110 volts from the regulator. If the output voltage requirement decreases, the shift register is programmed down one count at a time until the regulator again supplies between 5 and 110 volts.

There are a number of refinements in the operation to accommodate various operating procedures. Some of these are for general use and some are for very specific applications. They are all described below in connection with the various figures of the drawing.

Figure 1:
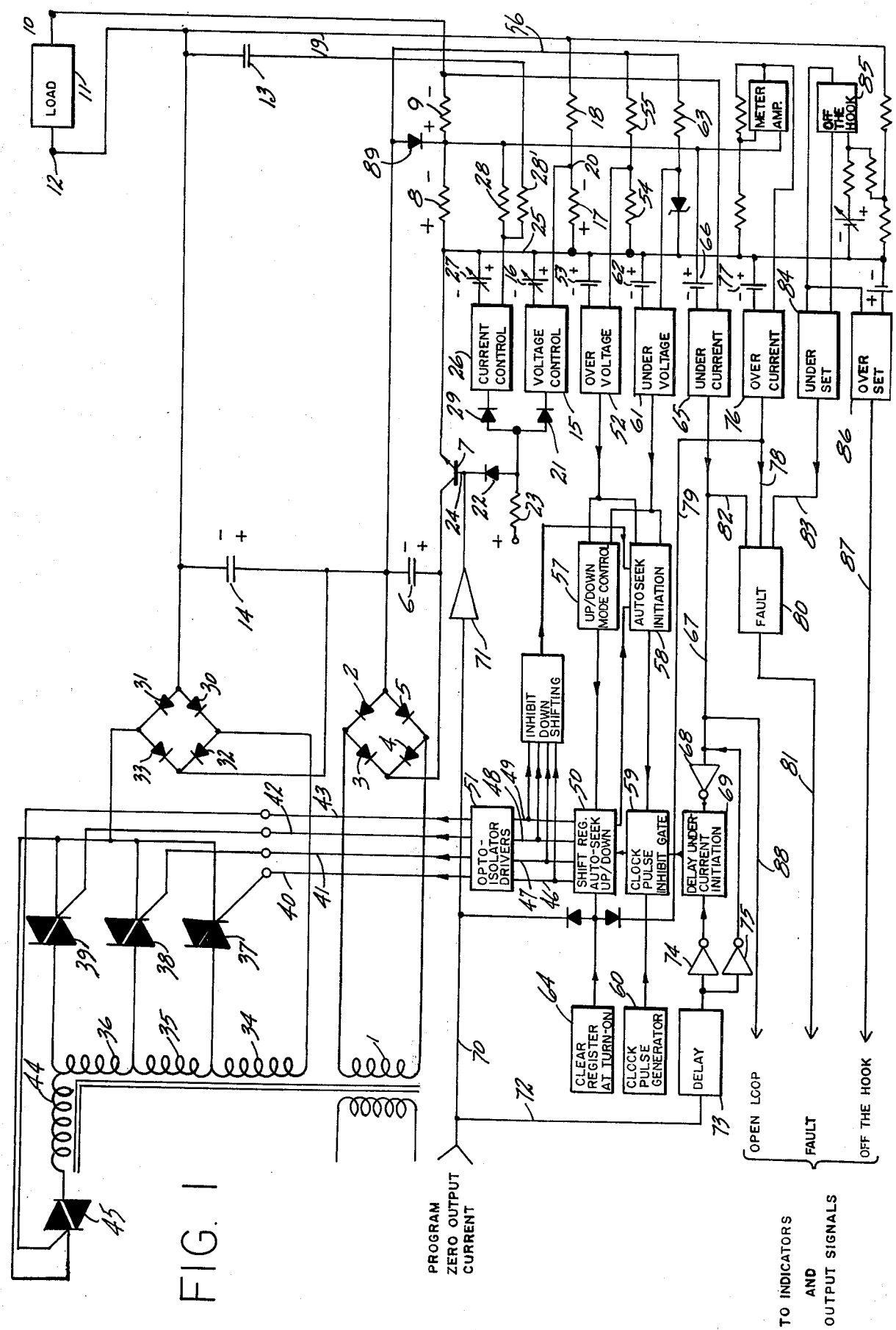
FIG. 1 is a block diagram of the preferred form of the present invention.

FIG. 1 is a block diagram of the preferred form of the present invention. Two sources of dc power are connected in series across the load. One of these sources is highly regulated while the other is unregulated. The regulated source is supplied from a conventional power line transformer only secondary 1 being shown. The ac from secondary 1 is rectified by suitable means such as bridge rectifier 2, 3, 4 and 5 and the resulting dc is filtered by capacitor 6. The dc voltage across capacitor 6 plus the dc voltage across capacitor 14, if any, is applied through series regulating transistor 7 and resistors 8 and 9 to load terminals 10 and 12 across which is connected load 11 to be supplied with regulated voltage or current as the case may be. This first power source is designed to supply a nominal voltage, say from 0 to 100 volts and is highly regulated by series transistor 7. The total output voltage is controlled by a voltage control channel including a feedback control amplifier 15 which compares the voltage across a variable reference voltage source 16 with a portion of the total output or load voltage obtained at junction point 20 between voltage divider resistors 17 and 18 connected between line 19 in turn connected to high load terminal 12 and common line 25 coupled through current sensing resistors 8 and 9 to low load terminal 10. The amplified differential between these two input voltages to amplifier 15 is gated through gate diodes 21 and 22 to base 24 of series regulating transistor 7. Gate bias is supplied from a positive voltage source, not shown, through resistor 23 to the anodes of the gate diodes. A crossover current regulation is provided by a current control channel including a feedback control amplifier 26 which compares the voltage across a variable reference voltage source 27 with the load current voltage drop across current sensing resistor 8 through coupling resistor 28 and applies the amplified differential through gate diodes 29 and 22 to base 24 of series regulating transistor 7. As is well known, the amplifier (voltage or current) having the less positive output voltage will exert control through the gate diodes and control the load voltage or current as the case may be. The description up to this point is that of the basic 0–100 volt regulated supply which is a conventional crossover highly regulated power supply. The invention resides in the methods of and means for step-wise extending the voltage range automatically to higher voltages while preserving the same essential overall high degree of regulation.

A stepped, essentially unregulated source of dc voltage is provided by a suitable rectifier such as bridge rectifier 30, 31, 32 and 33 receiving ac from one or more of secondaries 34, 35, 36 and 44 connected in the circuit by the turning on of one of triacs 37, 38, 39 or 45 and providing a dc output across filter capacitor 14 and in series with the output of the regulated source across capacitor 6. Gating voltages are supplied to triacs 37, 38, 39 and 45 over gate control lines 40, 41, 42 and 43 respectively. Appropriate signals are provided for triac control by means of shift register 50 having output lines 46, 47,, 48 and 49 coupled to gate control lines 40, 41, 42 and 43 respectively by the opto-isolator drivers 51. This opto-isolator permits controlling relatively large voltages and at different levels by means of a small signal potential and without any coupling-up requirements. Shift register 50 is programmed in order to turn-on the appropriate triac as will be described below. The triacs are turned on or off which, in contrast to prior phase control systems, does not generate noise in the system.

The system of the present invention is designed to operate with the highly regulated supply providing voltage between specified limits say 5 and 110 volts and the stepped supply programmed to make this possible. For example, the stepped supply is designed to provide increments of 100 volts so that if an output voltage of 250 volts is called for, the stepped supply will be operated on the second step providing 200 volts and the base or highly regulated supply will be operated at 50 volts making a total of 250 volts. The circuit is designed so that if the base supply is providing over 110 volts, an additional step of 100 volts will be called into play and if the base supply is providing less than 5 volts, a step lower is taken on the stepped supply. The first, or overvoltage requirement, is sensed by over-voltage differential amplifier 52 which compares reference voltage 53 with a portion of the output voltage of the regulating supply taken over line 56 and divided by resistors 54 and 55. When an over-voltage is sensed across the regulating supply over line 56, an output from amplifier 52 is applied to up/down mode control 57 and auto-seek initiation 58. The up/down mode control applies an up count control to shift register 50 and auto-seek initiation 58 opens clock pulse inhibit gate 59 which in turn allows a clock pulse from clock pulse generator 60 to increment the count in shift register one count up. The shift register output on lines 46, 47, 48 and 49 moves up one step turning on the next higher voltage triac of triacs 37, 38, 39 and 45.

The reverse takes place when an under voltage is sensed by under-voltage sensor amplifier 61 indicating that the regulated supply is supplying too little of the output voltage. The regulated supply output voltage coupled through resistor 63 is compared with a reference voltage 62 of say 5 volts and when the output voltage drops below this 5 volts, amplifier 61 signals up/down mode controller 57 to operate in down mode and auto-seek initiator 58 to ungate a clock pulse. This clock pulse through opened gate 59 actuates shift register to count down one count which in turn energizes the next lower step circuit through opto-isolator driver 51 and the next lower voltage triac (37, 38, 39 or 45). This substracts an increment from the unregulated voltage thus demanding more voltage from the regulated source.

In order to prevent hunting in the system the clock is operated at a sufficiently low rate so that the system has time to settle before a further change can be made. The rate which can be used for the clock depends on the speed of response of the unregulated power supply. Since it is shunted by a relatively large filter capacitor, it is a relatively slow response supply. In one particular model a clock pulse every 0.35 second was found to be satisfactory An important safety provision is possible with this system which combines two sources of power on a dc basis. When a relatively high voltage power supply is added to a lower voltage power supply employing a series pass transistor a problem arises in case the output of the combined supplies is short circuited. The problem arises from the fact that under these conditions the high voltage power supply output capacitor may discharge through the lower voltage pass transistor. In the present system diode 89 connected across the output of the lower voltage power supply provides a discharge path for capacitor 14, under short circuit conditions, preventing any excess voltage from reaching pass transistor 7.

Power supplies operated in current regulating mode generally exhibit a much higher ripple voltage on the output due to the fact that the current sensing circuit feeds back a relatively low sample of ripple voltage. This problem has been solved in the present system by feeding back degeneratively a large sample of the output ripple through an ac coupled circuit. Capacitor 13 connected from the high side of the output, terminal 12, and through resistor 28' to the input of current control amplifier 26 where the output ripple signal is summed with the current sensed signal fed through resistor 28. The feedback phase is such that the output ripple is highly degenerated by this circuit resulting in a greatly reduced output ripple voltage when operating in current regulating mode.

One other provision is important to the basic system as described above and that is means for turning the system on in an orderly fashion. When power is turned on a shift register, the register may come on in any output condition. In order to insure that initially the shift register is cleared, a time delayed clearing circuit 64 is coupled to shift register 50. When power is first applied to this system as by closing the primary circuit (not shown) thereby energizing secondaries 1, 34, 35, 36 and 44, dc builds up across regulated supply filter capacitor 6 only. Shift register 50 is held at zero count by delay circuit 64 so that no triac passes current. After a period of time sufficient for all units to attain operating condition, the clearing circuit 64 is deactivated allowing final adjustment of the system through the operation of shift register 50, Further details of this and other portions of the circuit will be given in connection with FIG. 2.

This completes the general description of the preferred form basic system in accordance with the present invention. The balance of the blocks shown in FIG. 1 are provided to adapt the basic system having many applications to one specific application, that of a fire alarm system. Various conditions of the load, a remote circuit of fire alarm boxes, are sensed and indicated. One of the special provisions is to take care of the condition resulting from signalling from a mechanical fire box. When a mechanical fire box calls the current is periodically interrupted for approximately seven seconds. This results in an under-current condition detected by under-current detector-amplifier 65 which compares the drop across current sensing resistor 9 with a reference voltage 66 and sends out a signal on line 67. The normal current regulator 26 at this point is calling for more current but the under-current control over line 67, through inverter 68 to delay circuit 69 inhibits the clock pulse gate 59 for 10 seconds, to more than cover the 7 second interruption period. It is desirable to maintain all controls unchanged during this mechanical calling period.

Another special provision is one to allow programming the output current to zero for a very short time. This is done over line 70 through driver 71 to base 24 of pass transistor 7. The system takes a finite time to decay and build back to full output. During this time the under-current control described above is to be disabled. This is done by means of a signal over line 72 to delay means 73 which inhibits the delay 69 acting through inverters 74 and 75 for a predetermined interval, say 5 seconds.

An over riding current protection circuit set at some predetermined value, say 200 milliamperes, is provided by over-current detector-amplifier 76 which senses over-current across current sensing resistor 8 comparing the drop with reference 77 and sending output signals on lines 78 and 79. The signal on line 78 goes to fault gate 80 and the signal on line 79 goes to clear shift register 50 thereby cutting back the source of unregulated voltage to zero.

Fault gate 80 has an output over lead 81 going to a fault indicator, not shown. The conditions considered faults to be indicated are "under current" over line 82, "over current" over line 78 and "under set" over line 83. The "under set" refers to an improper setting made by the system operator and detected by detector 84.

One other special condition is called "off the hook." In some fire department systems a telephone handset is used at the remote boxes. If the receiver is left off the hook after a call is made, the state is detected by detector 85 and relayed through "over set" amplifier 86 to output the off the hook indicator line 87. An undercurrent condition which may indicate an open loop is signalled over line 88.

Figure 2:
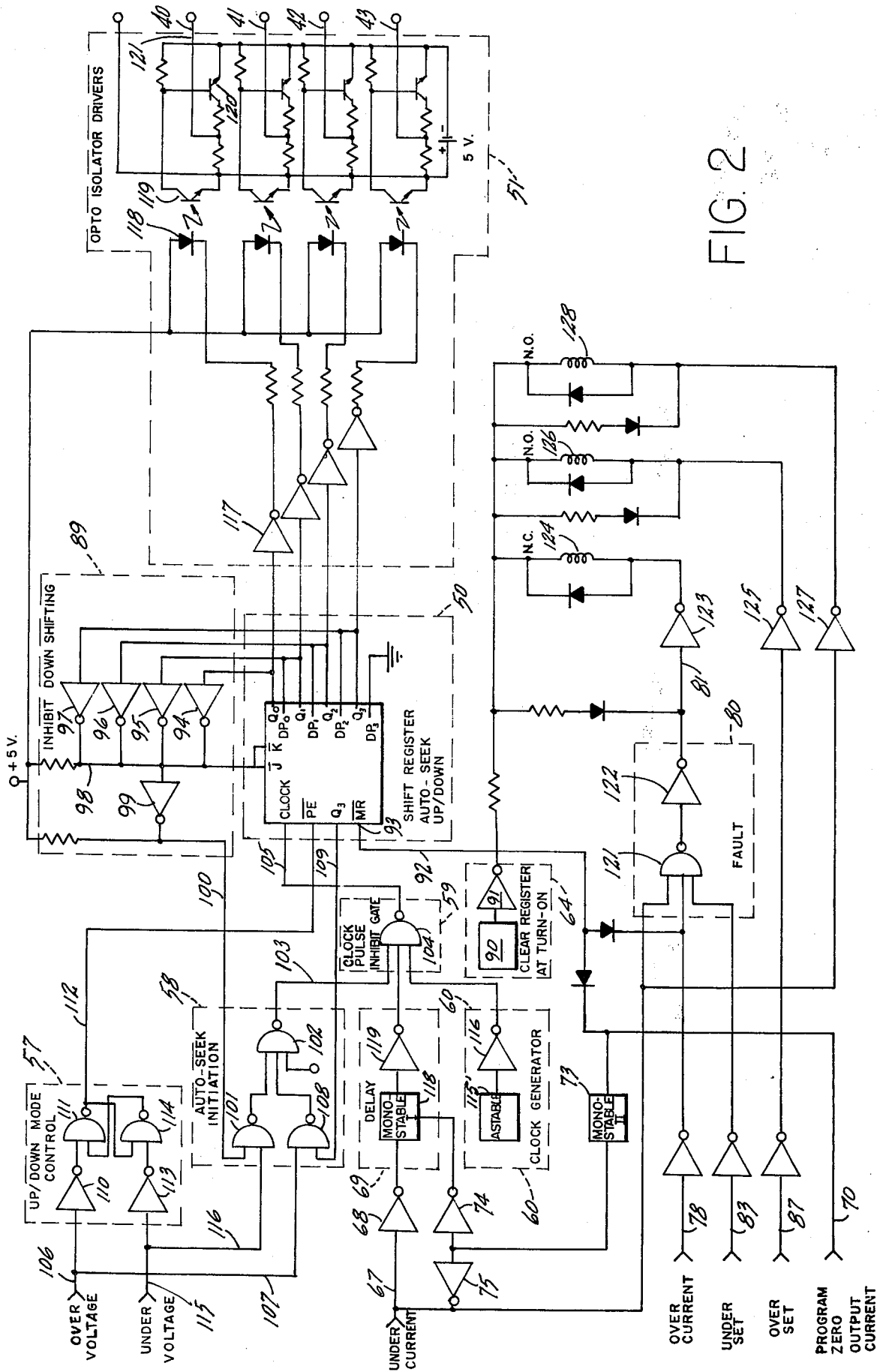
FIG. 2 is a diagram of the logic used in the form of the invention shown in FIG. 1.

While the present invention has been completely described above in connection with FIG. 1, certain details of the logic used are shown in FIG. 2 for further understanding and described below. The various corresponding blocks of the two Figs. are designated by the same numerals.

The operation of the system revolves around shift register 50 and hence its basic operation and symbology will now be described. This is a series/parallel shift register consisting of four flip-flop stages operated in the synchronous mode i.e. they are clocked. This device operates on the positive-going edge of the clock pulse and is operated in series mode. Each stage has a Q output, designated $Q_0$, $Q_1$, $Q_2$, and $Q_3$ and the last stage also has a $\overline{Q}_3$ output. When the parallel inputs $D_{PO}$ etc. are tied to the next higher Q outputs and $\overline{J}$ and $\overline{K}$ are tied to logic 1 (high), whenever the $\overline{PE}$ input is low when the clock goes high, the register output is advanced one output stage. conversely, whenever the $\overline{PE}$ input is high when the clock goes high, the register output moves down (left) one stage. The master reset $\overline{MR}$ resets the register to zero. When the register fills i.e. when the last Q output, namely $Q_3$ goes high, the compliment $\overline{Q}_3$ normally high, goes low.

Now, to describe the sequence of operation. When power is initially applied to the system, a delay circuit 90 holds the input to inverter 91 high for a brief interval sufficient for the resulting low output on line 92 applied to master reset input 93 to cause register 50 to clear. As soon as the output of the power supply has been established and is regulating properly, a determination is made by the over and under voltage sensors as to whether the regulator is within its predetermined limits. Since the register has just been reset, all Q outputs will be low (0). These low levels inverted by inverters 94, 95, 96 and 97 of inhibit down shifting circuit 89 and wire-ORed on line 98 to the input of inverter 99 will cause line 100 to go low (0). This 0 at the input to NAND gate 101 in auto-seek initiation circuit 58 will place a high (1) on one input to NAND gate 102 which in turn places a low (0) on line 103 inhibiting NAND gate 104 of clock pulse inhibit gate 59 so that no clock pulse can pass over line 105 to the clock input of shift register 50. The reason for this provision is that if the shift register is already at zero, it cannot be programmed lower and any under voltage signals are to be inhibited.

However, if an over voltage signal is present on line 106, the up/down mode control 57 inverts this high signal once in inverter 110 and again in NAND gate 111 so that a high signal (1) is fed over line 112 to the $\overline{PE}$ input of shift register 50 which, when inverted again provides low (0) PE signal. As stated above with PE low when the leading edge of the clock pulse is received at the clock input, the register is incremented by one stage, If this is the first positive going increment after turn-on, a high (1) appears $Q_0$ output of shift register 50. This 1 is inverted in buffer 117 and turns on light emitting diode 118 which in turn energizes light sensitive transistor 119. The signal generated by transistor 119 is amplified by transistor 120 and fed out over line 121 to turn on triac 37 of FIG. 1, the first voltage step in the unregulated voltage supply. Subsequently, each time there is a high signal on the over voltage line 106 at the time of the positive going clock pulse, the shift register will increment one count or stage turning on the next higher voltage triac. When the last stage $Q_3$ is turned on, the corresponding $\overline{Q}_3$ output will go low signalling that no further incrementing can take place. This low (0) is fed over line 109 to gate 108 and after reversal and passing through gate 102 and over line 103 inhibits clock pulse inhibit gate 104 (59) so that as long as register 50 is filled, no further clock pulses can be passed in response to an over-voltage signal.

Under-voltage operates in a similar manner but poled to program the shift register down. An under-voltage signal (1) received on line 115 is inverted once in inverter 113, again in NAND gate 114, and again in NAND gate 111 placing a low (0) signal on line 112 and hence on the $\overline{PE}$ input to shift register 50. This under-voltage signal on line 115 also is applied over line 116 to NAND gate 101 where, if all of the Q outputs are not low, is passed to NAND gate 102 and in turn over line 103 to clock pulse inhibit gate 104 which if not otherwise inhibited passes a clock pulse over line 105 to the shift register clock input. The low signal at $\overline{PE}$ at the up-going edge of the clock pulse causes shift register 50 to count down one stage and thus moving the triac conduction from one triac to the next lower voltage triac.

The clock pulses for the system are provided by a stable multivibrator 115' set to generate a pulse every 0.35 second. Clock pulses are buffered by inverter 116 and applied to one input of NAND gate 104. This gate as described above determines what clock pulses will be passed to the shift register for the incrementing process.

The 10 second delay 69 described in connection with FIG. 1 is implemented by monostable multivibrator 118 buffered by inverter 119. The 5 second delay 73 is also implemented by a monostable multivibrator. Fault indicator circuit 80 includes NAND gate 121 and buffer 122. The various fault conditions are buffered by one of buffers 123, 125 and 127 and indicated by suitable indicators associated, but not shown, with relays 124, 126 and 128.

Figure 3:
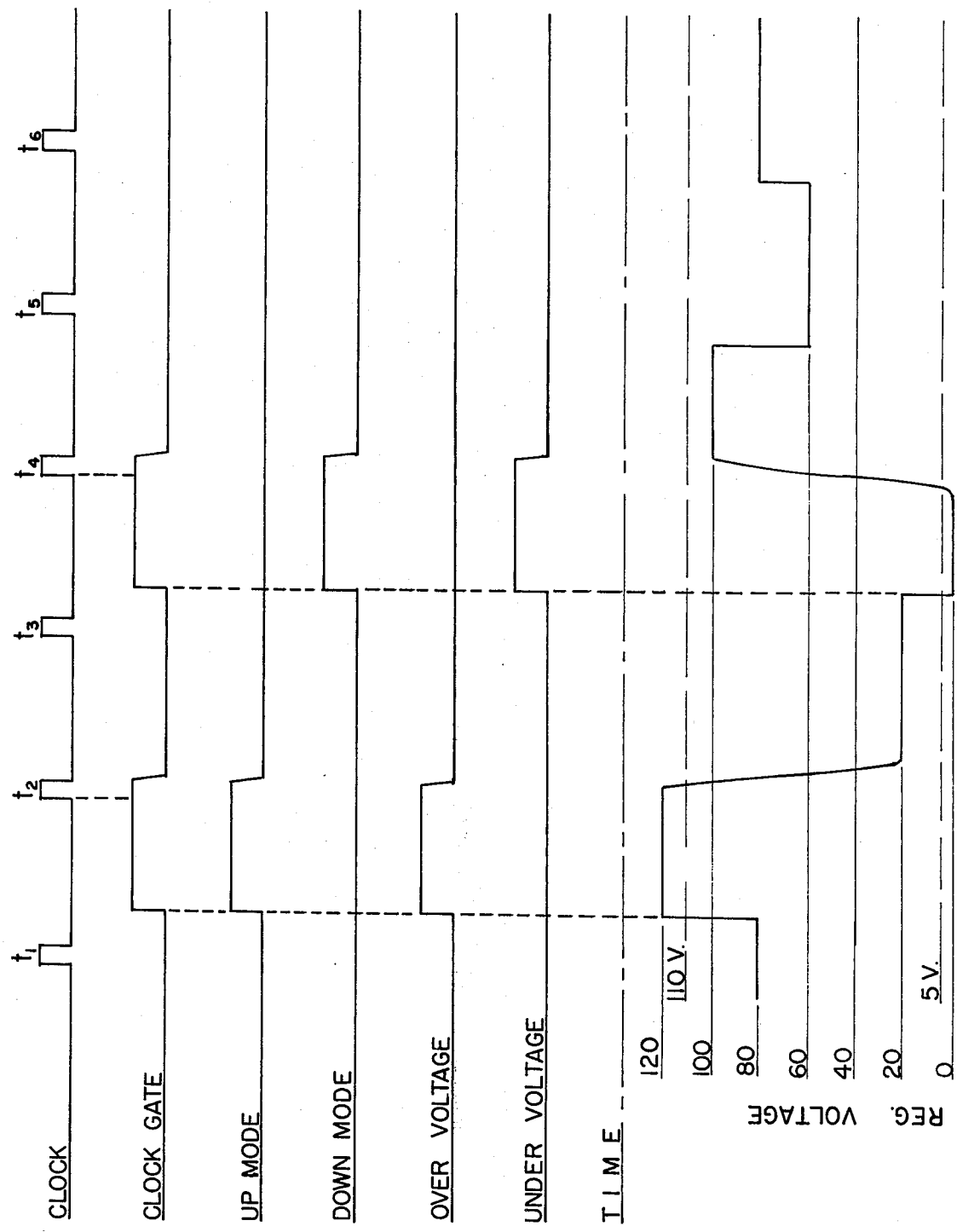
FIG. 3 is a series of waveform patterns showing various conditions plotted against time useful in explaining the operation of the invention.

FIG. 3 is a timing diagram graphically showing the relative time of various events in the circuit. The top line of the diagram shows a series of clock pulses equally spaced at times $t_1$ through $t_6$. These will be used as a reference time scale for the events to be described. Below the clock time pulses are plotted the events to be analyzed; first, the clock gate response; second, the up mode response; third, the down mode response; fourth, the over-voltage detector response; fifth, the under-voltage detector response; and finally a sample voltage chart of a changing output voltage assumed to follow a pattern which demonstrates the response of the above enumerated system components. The lower or voltage plot is made against a voltage scale and the maximum or over-voltage of 110 volts and the minumum or under-voltage of 5 volts are shown as dotted lines.

To follow the sequence of events caused by output voltage changes it is seen that at the time of the first clock pulse $t_1$, the regulated voltage is at 80 volts. This means that whatever output voltage is being called for, the regulator is being called on to supply 80 volts of it. Since 80 volts is within the over/under- voltage limits, no action takes place. However, at some time after $t_1$ the output voltage is assumed to be changed so that the regulator is called on to supply 120 volts as shown in the voltage plot. This being more than the over-voltage limit causes the over-voltage detector to go high which in turn opens the up-mode gate and the clock gate all as shown vertically over the projected intersection of regulated voltage crossing the 110 volt over-voltage limit line. With the clock gate open, the next clock pulse, which can be seen to be at $t_2$, will increment the shift register adding 100 volts to the unregulated voltage and relieving the regulated voltage source by that amount. This in turn causes the regulated voltage to be regulated down by 100 volts to 20 volts as seen on the voltage curve just after the time $t_2$ of the clock pulse. Thus, with the regulated voltage again within regulating limits, the over-voltage detector, up mode gate and clock gate close down.

Assuming conditions continue in this state for a while so that at the next clock pulse time $t_3$ there has been no change. No action is called for. Again, assume that shortly after time $t_3$ the output voltage is programmed downward so that less than 5 volts is demanded of the regulated supply. At this point i.e. where the regulated voltage line crosses the dotted 5 volt line, an under-voltage is detected by the under-voltage detector causing it to go high. This in turn opens the down mode gate and the clock gate. Action takes place at the up swing of the next clock pulse $t_4$ and the shift register is incremented down one count; the next lower voltage triac is activated; the unregulated voltage falls by 100 volts and the regulated voltage is called on for an additional 100 volts. The gates close and no further action takes place for the next several clock times since the regulated voltage is assumed to be at 60 volts at time $t_5$ and 80 volts at time $t_6$ neither of which cross the over or under voltage limits.

While the preferred form of the present invention has been shown and described, many modifications are possible within the spirit and scope of the invention as set forth in the appended claims.

I claim:

1. In a regulated power dc supply, the combination of;
    a first power supply including series regulating means;
    a second power supply;
    circuit means connecting said two power supplies in series aiding mode to a pair of output terminals;
    feedback means for controlling said series regulating means to provide a predetermined regulated voltage or current to said output terminals;
    means for sensing the voltage contributed by said first power supply to the total voltage across said terminals;
    means for incrementing said second power supply in discrete steps both to increase or to decrease the voltage contributed by it to the combined voltage across said load terminals;
    and means for actuating said incrementing means of said second power supply to increase its contribution when said sensed voltage is greater than a predetermined voltage and to decrease its contribution when said sensed voltage is less than a predetermined voltage.

2. A regulated dc power supply as set forth in claim 1, and wherein;
    said incrementing means provides discrete steps of the order of 100 volts in the voltage contributed by said second power supply.

3. A regulated dc power supply as set forth in claim 1, and wherein;
    said incrementing means comprises a plurality of triacs for controlling the input voltage to said second power supply.

4. A regulated dc power supply as set forth in claim 3, and wherein;
    the gates of said triacs are electrically isolated by means of optical couplers.

5. A regulated dc power supply as set forth in claim 1, and including;
    a current sensing resistor connected in series with said series regulating means;
    and degenerative feedback means connected between said current sensing resistor and said regulating means for regulating the current supplied to said output terminals.

6. A regulated dc power supply as set forth in claim 1, and wherein;
    said incrementing means is controlled by digital circuitry.

7. A regulated dc power supply as set forth in claim 1, and wherein;
    said incrementing means comprises digital citcuitry including a shift register, a clock coupled to said shift register, opto-isolator drivers connected between said shift register and a plurality of triacs.

8. A regulated dc power supply as set forth in claim 1, and including;
    means for programming the current fed to said output terminals to zero while delaying the operation of said incrementing means for a predetermined interval of time.

9. A regulated dc power supply as set forth in claim 1, and including;
    means for indicating a plurality of predetermined conditions of loading across said output terminals.

10. A regulated dc power supply as set forth in claim 1, and including;
    a diode connected across said first power supply for protecting said series regulating means from excessive voltage in the event of a short circuit across said output terminals.

* * * * *